United States Patent
Lewis et al.

(10) Patent No.: US 8,548,445 B2
(45) Date of Patent: *Oct. 1, 2013

(54) ABBREVIATED DIALING

(71) Applicant: AT&T Mobility II LLC, Atlanta, GA (US)

(72) Inventors: John Lewis, Lawrenceville, GA (US); Justin Allan McNamara, Dunwoody, GA (US); Fulvio Arturo Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/797,649

(22) Filed: Mar. 12, 2013

(65) Prior Publication Data

US 2013/0196639 A1 Aug. 1, 2013

Related U.S. Application Data

(63) Continuation of application No. 12/342,873, filed on Dec. 23, 2008.

(51) Int. Cl.
| | | |
|---|---|---|
| *H04M 1/00* | (2006.01) | |
| *H04B 1/38* | (2006.01) | |
| *G06F 3/00* | (2006.01) | |
| *G06F 3/048* | (2013.01) | |

(52) U.S. Cl.
USPC ........ 455/414.1; 379/354; 455/564; 715/739; 715/780

(58) Field of Classification Search
USPC ................. 379/354, 355, 100; 455/564–567, 455/550.1, 414.4; 715/780, 738, 739; 709/219
See application file for complete search history.

(56) References Cited

U.S. PATENT DOCUMENTS

| | | | |
|---|---|---|---|
| 6,097,808 | A | 8/2000 | Chang |
| 6,766,017 | B1 | 7/2004 | Yang |
| 6,895,559 | B2 | 5/2005 | Forder |
| 6,985,559 | B2 | 1/2006 | Hardy |
| 7,313,760 | B2 | 12/2007 | Grossman et al. |
| 7,418,663 | B2 | 8/2008 | Pettinati et al. |
| 2002/0052196 | A1 | 5/2002 | Padawer et al. |
| 2004/0210844 | A1 | 10/2004 | Pettinati et al. |
| 2006/0142050 | A1 | 6/2006 | Lee |
| 2010/0159979 | A1 | 6/2010 | Lewis |

*Primary Examiner* — Nizar Sivji
(74) *Attorney, Agent, or Firm* — Woodcock Washburn LLP

(57) ABSTRACT

An intelligent abbreviated dialing feature can use a portion of a phone number as a shortcut to dialing. Any portion of a phone number can be input into a communications device such as by pressing buttons on the keypad or speaking into a microphone. A processor in the communications device or on a network accessible by the communications device can generate the phone number register from frequently dialed numbers. The processor can compare the input into the communications device against the phone number register. For each digit of the phone number that is input into the communications device, the processor can search the phone numbers and provide search results with the corresponding numbers. A phone number can be selected from the search results and dialed.

20 Claims, 7 Drawing Sheets

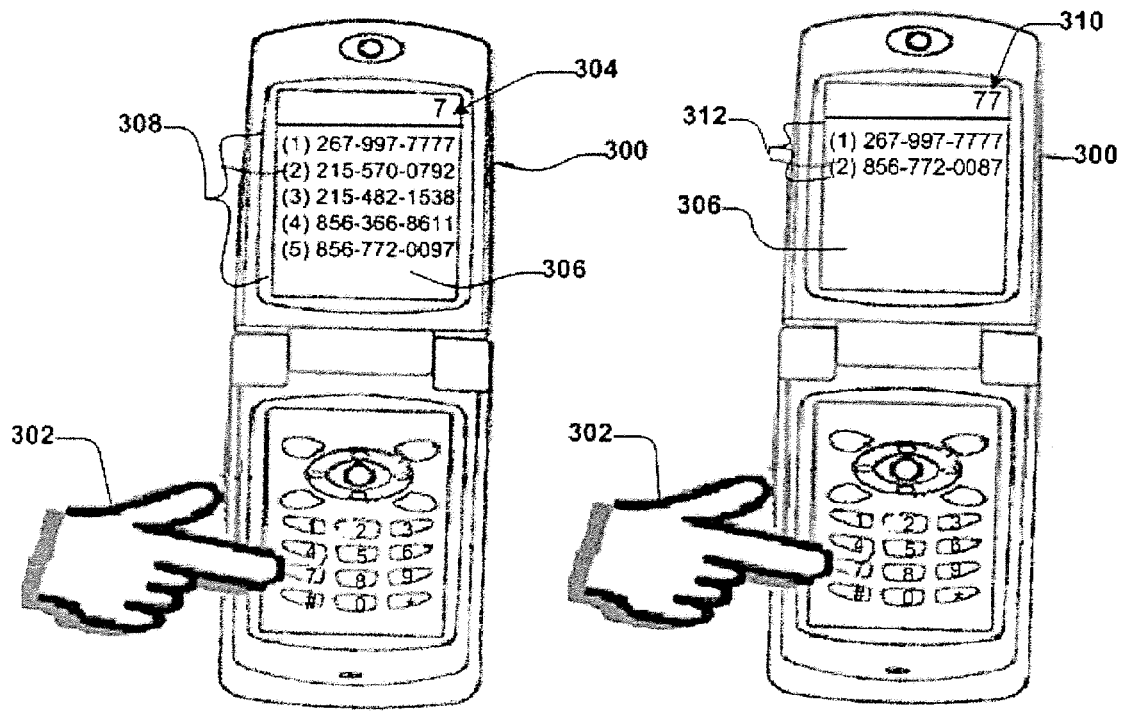
Fig. 3A
Fig. 3B
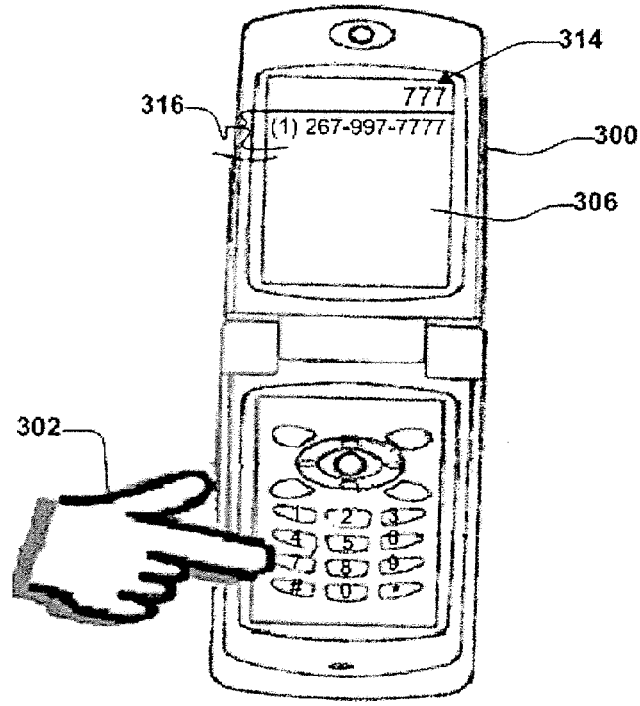
Fig. 3C

ABBREVIATED DIALING

CROSS REFERENCE TO RELATED APPLICATIONS

The instant application is a continuation application of, and claims priority to, U.S. patent application Ser. No. 12/342,873 filed Dec. 23, 2008. U.S. patent application Ser. No. 12/342,873 is hereby incorporated by reference in its entirety.

BACKGROUND

Mobile phones typically have a speed dialing feature that stores numbers and utilizes shortcuts to dial them. A shortcut may be entered into a memory location of the mobile phone, such as by storing an identification code associated to a particular number. For example, the identification code for a shortcut that dials a particular number can be defined by a specific button or sequence of buttons on the mobile phone. Then, when the shortcut button(s) is pressed, the entire number associated with the shortcut button(s) is dialed. Typically the shortcut involves a combination of buttons, such as a digit (0-9) on the keypad followed by # or a function button.

Each shortcut, or identification code, is pre-programmed for dialing a specific number. The speed dial feature often goes unutilized because users forget what number is associated with which shortcut. Further, speed dial phones typically have limited speed dial capacity. Speed dial capacity refers to the quantity or numbers that the phone can remember or the quantity of speed dial shortcuts are available. This limits the use of shortcuts for dialing on the mobile phone. In addition, every time the user wants to update the predetermined shortcut list, the user has to re-program the shortcut list. This often requires that the user re-learn the method for programming the shortcut list.

SUMMARY

Disclosed herein is an intelligent abbreviated dialing feature that can use any portion of a phone number as a shortcut to dialing. Any portion of a phone number can be input into a communications device such as by pressing buttons on the keypad or speaking into a microphone. A processor in the communications device or on a network accessible by the communications device can compare the input against a phone number register, which comprises phone numbers stored in a memory. A processor can generate the phone number register from frequently dialed numbers. For each digit of the phone number that is input into the communications device, the processor can search the phone numbers in the phone number register to find phone numbers that correspond to the input.

In an example embodiment, if the search results comprise more than one phone number, the communications network server or processor may request a digit adjustment from a communications device over the communications network. In another example embodiment, the communications device receives the request for digit adjustment and searches a phone number register for corresponding phone numbers. An adjusted phone number selected for connection can be added to the phone number register in an order of connection such that the most recently selected adjusted phone numbers are displayed in such order to the user. Thus, the frequently dialed numbers can be those that are the most frequently dialed adjusted phone numbers, rather than just frequently dialed numbers which may have been dialed by any method. The user can select a number to dial from the search results. The search results may be filtered down to just one number, at which point the user can select to dial that number or the phone may be programmed to automatically dial the number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIGS. 3A-3C each depict a communications device 300, shown as a mobile phone, displaying various example results of the disclosed techniques.

DETAILED DESCRIPTION OF ILLUSTRATIVE EMBODIMENTS

Figure 1:
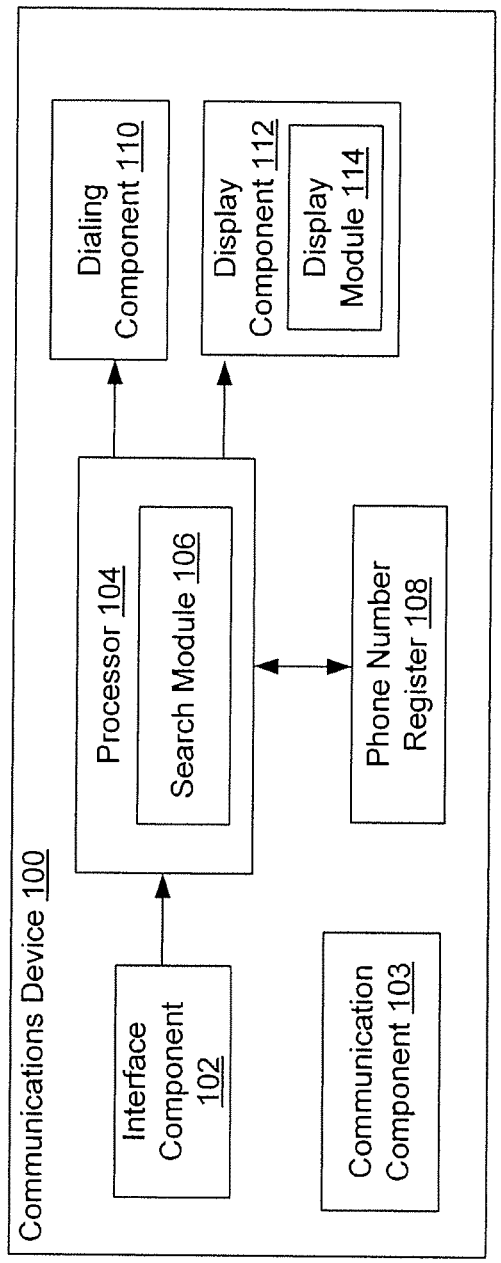
FIG. 1 depicts an example configuration of a communications device 100 that can utilize the disclosed techniques.

Disclosed herein is an intelligent abbreviated dialing feature that can use any portion of a phone number as a shortcut to dialing. A communications device may be adapted to receive an input by a user, such as the entry of a digit(s) on the keypad. The digit entered may be part of a phone number the user wishes to dial. A processor may compare that digit against a phone number register stored in memory. If there is a match between the digit(s) entered with a digit(s) of any phone number in memory, a display unit of the communications device can display a list of phone numbers with the matching digit(s). The user can select to dial a number from this list. If enough digits are input into the communications device, the list of matching numbers may be narrowed down to only one, at which point the communications device can be configured to automatically dial the remaining matching phone number.

In an example configuration, the processor that generates and searches the phone number register is a processing unit integrated into the communications device. In another example configuration, a network device can manage the processor and handle the generation and storage of a phone number register. For example, a communications provider can offer a service via a communications network that receives a signal responsive to an input into a communications device, such as one or more digits. Based on that signal, the provider can search a phone number register and return search results based on the signal. It is also contemplated that any combination of entities can manage any number and combination of processors for generating and storing the phone number register, searching the register, displaying the search results, and dialing a selected phone number.

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made without departing from the scope of the present disclosure. For example, although some aspects herein relate to methods of searching a phone number register generated and stored by a network device or communications device, it should be noted that the phone number register may generated by any appropriate processing unit. Similarly, although some aspects relating to a communications device contemplate a device capable of communicating over a communications network, it should be noted that any method of communication is contemplated that enables a communications device to communicate with another communications device or telecommunications component.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," "an example embodiment," or similar language means that a particular feature, structure, or characteristic described in connection with the embodiment is included in at least one embodiment of the present techniques disclosed. Thus, appearances of the phrases "in one embodiment," "in an embodiment," "an example embodiment," and similar language throughout this specification may, but do not necessarily, all refer to the same embodiment.

In the discussion that follows, details relating to mobile and communications devices and networks are assumed to be well known. Accordingly, such details are largely omitted herein for the sake of clarity and explanation. Furthermore, the described features, structures, or characteristics of the disclosed techniques may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosed techniques. One skilled in the relevant art will recognize, however, that the disclosed techniques may be practiced without one or more of the specific details, or with other methods, components, materials, and so forth. In other instances, well-known structures, materials, or operations are not shown or described in detail to avoid obscuring aspects of the disclosed techniques.

FIG. 1 depicts an example configuration of a communications device 100 that can utilize the disclosed techniques. A communications device 100 may be any device capable of wired or wireless communications and telecommunications. The communications may be accomplished via a connection to a communications network, such as a network that routes calls to connect two communications devices, or via a close proximity wireless transmission, such as via a radio frequency link, using walkie-talkie capabilities, or the like. As contemplated by various embodiments of the techniques disclosed, a communications device may include, but is not limited to a radiophone, a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, or the like. With respect to FIG. 1 and the discussions that follow, any reference herein to an example embodiment of a communications device 100 involving a cellular telephone is solely for purposes of explanation, and is not intended to limit the techniques disclosed to any such embodiment.

The communications device 100 may operate in a cellular, SMR, PCS, cordless, unlicensed AWS, 700 MHz, or other spectrums. However, embodiments are not limited to those with network access, and the embodiments that describe network access are not limited by a network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

The communications device 100 can include hardware components such as a processor, a graphics card, a storage component, a memory component, an antenna, a communication component, an interface component such as a speaker, a display, a keypad, a microphone, or the like. The communications device 104 may also include software components such as an operating system that may control the hardware components.

In the embodiment shown in FIG. 1, the communications device 104 includes an interface component 102, a processor 104 having a search module 108, a phone number register 108, a dialing component 110, and a display component 112 having a display module 114.

The communication component 103 may include an antenna, communication port, or the like that may be used to establish a communication link. The communication component 103 may then communicate with servers or the like over a network, for example, to connect the communications device with other telecommunications components, such as another communications device or a switching network. A network may include, for example, an intranet, the Internet, a local area network (LAN), a wide area network (WAN), a public switched telephone network (PSTN), a cellular network, a voice over internet protocol (VoIP) network, and the like, for example.

The processor 104 may include any appropriate type of processor such as a single processor, multiple processors that may be distributed or centrally located, or the like. For example, the processor 104 may be a mobile communications device processor, a computer processor, a handheld processor, or the like. The processor 104 may include any other suitable hardware such as cache, Random Access Memory, storage devices, or the like and/or software. The disclosed features for abbreviated dialing can be added to software of the processor.

The interface component 102 may include, for example, an input component such as a keypad, a touch screen, a button, a microphone, a function key, a speakerphone component, or the like, and an output component such as a transmitter, a speaker, a microphone, or the like. The communications device 100 may be adapted to receive an input by a user via the input component 102. For example, the user may enter a digit via the keypad or by speaking into a microphone or speaker component, for example. The digit entered may be part of a phone number the user wishes to dial. The processor 104, via search module 106, can search the phone number register 108 for a corresponding phone number. A corresponding phone number is a phone number in the phone number register 108 having the at least one digit.

A domestic phone number comprises an area code, a prefix, and a line number. The area code designates a specific geographic region. The prefix generally refers to a specific switch to which a phone line is connected. Each switch at a phone carrier's central office can have a unique three-digit number. The line number is assigned at the switch level to the phone line that you are using. For long distance or non-domestic phone calls, a "1" or a country code (i.e., international access code), respectively, may be dialed before the area code, prefix, and line number.

In an example embodiment, the corresponding phone number in the phone number register 108 having the at least one digit in a location other than a first digit location. Thus, the at least one digit could be located anywhere in the phone number and is not limited to searching from the beginning of a phone number, as is most traditional phone number search technologies.

The processor 104 may compare the digit against the phone numbers in the phone number register 108. The processor 104 may provide the results of the search (e.g., a list of corresponding phone numbers, one corresponding phone number, null results, or the like) to a display component 112 of the communications device 100. The display component 112 can display the search results to the user. In an example embodiment, the user can select to dial a number from the displayed list. The dialing component 110 can initiate the dialing of the selected number. If the search of the phone number register 108 only results in one corresponding phone number, the dialing component may be programmed to automatically dial the corresponding phone number.

The user may put more than one digit into the communications device 100. The processor 104 may search the phone number register 108 for corresponding phone numbers. In an example embodiment, the search module 106 compares the multiple digits, in the order by which they are input, against the phone numbers in the phone number register 108. A corresponding phone number in this example is a phone number having the multiple digits in the same order by which they are input. Thus, the list of corresponding numbers may be narrowed down. The display component 112 can display the search results to the user and the user can select to dial a number from the displayed list. Again, if the search of the phone number register 108 only results in one corresponding phone number, the dialing component 110 may be programmed to automatically dial the corresponding phone number.

The processor 104 may generate the phone number register 108. For example, the processor 104 may generate a list of phone numbers according to various methods and store these in the phone number register 108. The phone number register 108, which may comprise phone numbers, may be stored on a non-removable media, such as a computer chip installed in the communications device, a removable media (e.g., a Secure Digital card, a flash drive, a USB drive, magnetic tape, floppy disk, a compact disc, or the like) or a removable drive such as a removable hard drive. The phone number register 108 storage unit may be communicatively coupled to the processor 104.

The processor 104 may generate the phone number register 108 by storing an indication of numbers that are frequently dialed or received by the communications device 100. For example, many users make frequent calls to spouses, family members, children, doctors, stores, gyms, offices, co-workers, or the like. The processor 104 may be configured to recognize when a number is called frequently and add this to the phone number register 108. In an example embodiment, the processor 104 will add a phone number to the phone number register 108 after the number is dialed a predetermined frequency of times, or a call is received from that number a predetermined frequency of times. For example, if a call is received from the same number 15 times in a month, the processor 104 can be programmed to include that number in the phone number register 108. Thus, if a user inputs a digit into the input component 102, the digit may be compared against a list of phone numbers in the phone number register 108 that are most frequently dialed. The processor 104 may also generate the phone number register 108 using numbers from incoming/outgoing calls made to/from the communications device, recent incoming/outgoing calls, a contact list stored in the communications device or a computing device that can connect to the communications device, or the like.

Figure 2:
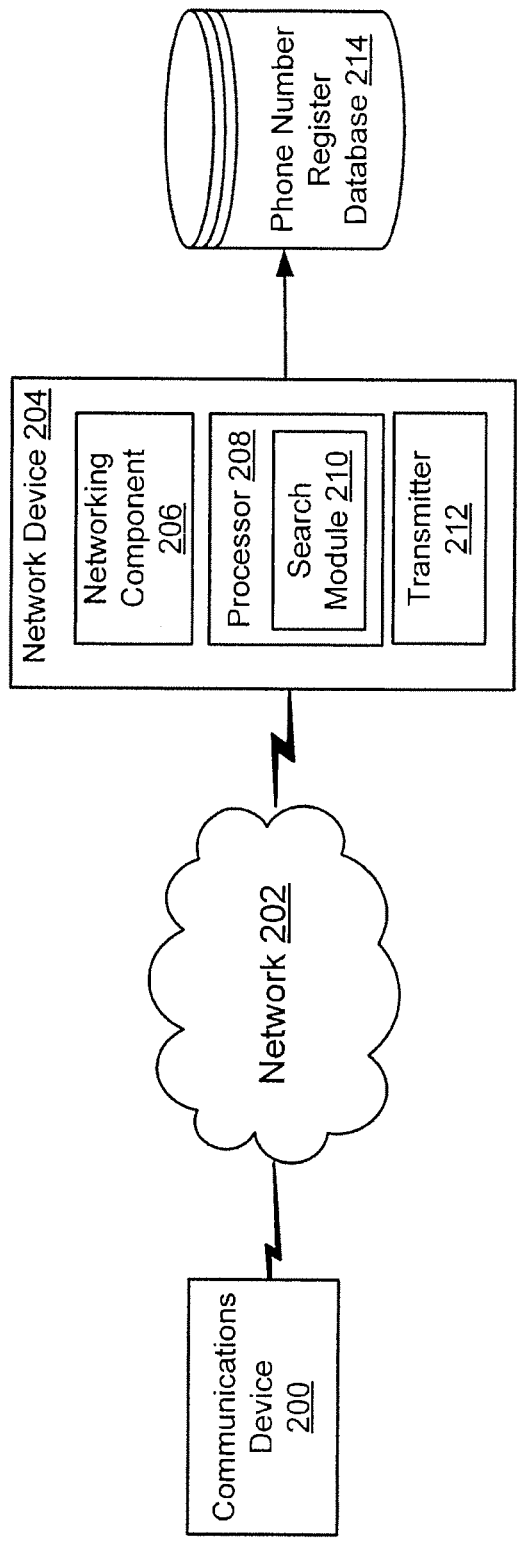
FIG. 2 depicts an exemplary networked environment that depicts an example configuration of components that can utilize the disclosed techniques.

FIG. 2 depicts an exemplary networked environment that depicts an example configuration of components that can utilize the disclosed techniques. The networked environment can include a network 202 and a network device 204. As shown in FIG. 2, a communications device 200 may be in communication with a network 202. The network device 204 may generate and/or access a phone number register database 214, which may store a phone number register. In this example configuration, a network device 204 includes the processor 208 that manages and stores the phone number register. Thus, a communications provider can utilize a network device 204 to offer a service via the communication provider's network that supports abbreviated dialing. For example, the network device 204 can receive, via the network 202, a signal responsive to an input to the communications device 200. The input may be representative of one or more digits. Based on that signal, the network device 204 can search the phone number register database 214 and return search results to the communications device 200 via the network 202. For example, a home location register (HLR) may receive a trigger to route a call to server 204 for digit adjustment For example, if the input is "777," and a dial button is pressed, a mobile switching center (part of a communications system) can return a trigger to the HLR for digit adjustment. The server 204 can replace the number with the matching number and route the call.

If there are choices, voice control/DTMF may be used to receive a selection by the user. The number identified and called can be added to the phone number register, such that the next time, "777" dials the previously selected number or lists that number at the top of the selectable list, without needing to receive a trigger from the MSC. By adding the adjusted phone numbers to the phone number register, in an order to which the communications device has been connected, the most recent phone numbers that are selected via the disclosed techniques may be displayed first to the user for selection. Thus, the frequently dialed numbers can be those that are the most frequently dialed adjusted phone numbers, rather than just frequently dialed numbers which may have been dialed by any method. The disclosed techniques are beneficial for a user that knows a digit of the number for which they desire to dial, filtering the display of a phone number register in an order based on those phone numbers that have been connected to and selected based on an input of at least one digit, rather than just those frequently dialed numbers. Those phone numbers, that are selected based on the user's input of at least one digit, are those that can be added to the frequently dialed numbers list. The communications device 200 can dial the number triggered based on the search results. Any method of employing such a service is contemplated, such as utilizing the Unstructured Supplementary Service Data (USSD) capability of GSM phones, utilizing an Internet Protocol (IP) network, Speak and Voice recognition, or the like.

The network 202 may be any type of communication network such as the internet, a Local Area Network (LAN), a Wide Area Network (WAN), a cellular telephone network, or the like. For example, the network 202 may include the example networks described below in FIGS. 3-5 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HERMDA"), edma2000 1x Evolution Data Optimized ("EVDO"), Code Division Multiple Access-2000 ("edma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

The network 202 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like.

The network device 204 may have a networking component 206, a processor 208 having a search module 210, and a transmitter 212. The networking component 206 can be configured to receive, via the network 202, a signal that is responsive to an input to the communications device 200. The input can be representative of at least one digit input into the communications device 200 via an input component, as described above with respect to communications device 100 in FIG. 1. The processor of the network device 204 can generate a phone number register based on numbers dialed from or numbers associated with numbers received by the communications device 200. In an example embodiment, the processor generates the phone number register from numbers that are frequently dialed from the communications device.

In the example configuration shown in FIG. 2, the phone number register is stored in the phone number register database 214. The phone number register database 214 may be any form of data storage, including a storage module, device, or memory, for example. The phone number register database 214 may be provided as a database management system, an object-oriented database management system, a relational database management system (e.g., DB2, Access, etc.), a file system, or another conventional database package. Further, the databases can be accessed via a Structure Query Language (SQL), or other tools known to one of ordinary skill in the art.

The phone number register database 214 may contain an inventory of phone number information, such as a structured collection of records and/or data associated with phone numbers, communication devices and users/entities associated with the phone numbers, networks that support communication with the communication devices, etc. The phone number register can include phone numbers from a global address book, a communication network's subscriber list, a subscriber's incoming/outgoing call list, or a subscriber's recent call list, for example. The information in the phone number register database 214 may be structured to enable a person or program to extract desired information to share information about the user. For example, if the processor 208 updates the phone number register database with phone numbers, the processor 208 of the network device 204, via the search module 210, may have access to such information to search the database. Thus, the search module can search the phone number register for a corresponding phone number. A corresponding phone number is a phone number in the phone number register having the at least one digit. The search module may compare the digit against the phone numbers from the phone number register.

The processor 208 may provide the results of the search (e.g., a list of corresponding phone numbers, one corresponding phone number, null results, or the like) to the network 202. The network 202 can provide the results of the search to the communications device 200. A display component of the communications device 200 can display the search results to a user. For example, the search results can be displayed as a selectable list on a display component. In an example embodiment, the user can select to dial a number from the displayed list. The network 202 may receive an indication of the user's selection and initiate the routing of the call through a communications network, such as network 202. If the search of the phone number register only results in one corresponding phone number, the network 202 can automatically initiate the routing of the call through a communications network, such as network 202.

A user may input more than one digit into the communications device. In an example embodiment, the processor can compare the multiple digits, in the order by which they are input, against the phone numbers in the phone number register. A corresponding phone number in this example is a phone number having the multiple digits in the same order by which they are input. Thus, the list of corresponding numbers may be narrowed down. The network device 204 can transmit the search results from the transmitter 212 to the communications device 200 via the network 202. Again, if the search of the phone number register only results in one corresponding phone number, the network 202 can automatically initiate the routing of the call through a communications network, such as network 202.

One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided. Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIGS. 3A-3C each depict a communications device 300, shown as a mobile phone, displaying various example results of the disclosed techniques. The phone number register referred to in each of the examples shown in FIG. 3A-3C is the same for purposes of this example. The phone number register may have a plurality of stored phone numbers. In FIG. 3A, the user 302 selects one "7," represented by 304, which is displayed on a display component 306 of the communications device 300. As described above, a processor may search the phone number register for corresponding phone numbers based on the input, which is a "7" in this example. The processor compares the "7" against phone numbers in a phone number register. A corresponding phone number is a phone number having a "7" somewhere in the entire phone number. The display component 306 can display the search results 308 to the user 302 via the display component 306, and the user 302 can select to dial a number from the displayed list. As shown in FIG. 3A, shown are five numbers having a "7." Thus, in this example, 5 corresponding numbers are displayed on the display component 306. The user 302 may select any of these numbers, such as by scrolling or selecting the designated number (1)-(5) associated with each number. Then, a dialing component may dial the selected number.

A user 302 may input more than one digit into the communications device. FIG. 3B depicts another example of the results from the processor, this time the search being a result of an input of "77," represented by 310. In this example, the processor can compare the "77" in that order against the phone numbers in the phone number register. A corresponding phone number in this example is a phone number having two "7"'s next to each other. Thus, the list of corresponding numbers may be narrowed down. As displayed on the display component 306, the search results 312 show two corresponding phone numbers having a "77." Again, the user 302 may select one of these numbers for dialing.

FIG. 3C depicts a third example of the results from the search by the processor, this time the search being a result of an input of "777," represented by 314. Again, the corresponding phone numbers in this example would be a phone number having the "777" in that order (i.e., the same order by which they are input). Thus, the list of corresponding numbers may be narrowed down. As shown, the search results 316 of the phone number register show one corresponding phone number, as displayed on the display component 306. In this example, the dialing component may be programmed to automatically dial the corresponding phone number. Alternately, the user 302 can select the one number shown to initiate dialing. Thus, the examples in FIG. 3A-3C indicate that the more digits entered by the user can narrow the search results.

Figure 4:
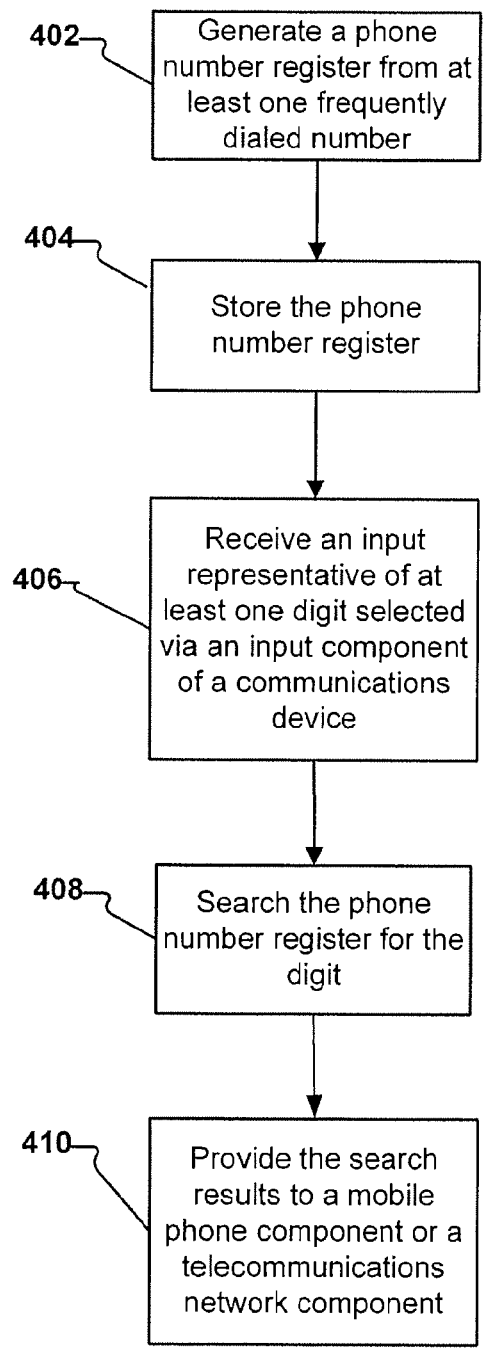
FIG. 4 depicts an example method of searching a phone number register for at least one corresponding phone number.

FIG. 4 depicts an example method of searching a phone number register for at least one corresponding phone number.

At 402, a processor may generate a phone number register by storing an indication of numbers that are frequently dialed or received by the communications device. For example, many users make frequent calls to spouses, family members, children, doctors, stores, gyms, offices, co-workers, or the like. The processor may be configured to recognize when a number is called frequently and add this to the phone number register. In an example embodiment, the processor will add a phone number to the phone number register after the number is dialed a predetermined frequency of times, or a call is received from that number a predetermined frequency of times. The list can be updated and rotated based on numbers most frequently called. The frequent call list could be generated by sorting an address book based on the actual use of the numbers, ordering them based on frequency, and accordingly, displaying the more frequent corresponding phone numbers first. The phone number register can further comprise phone numbers from a stored contact list, an incoming/outgoing call list, a recent call list, or the like.

The processor may store the phone number register, at 404, in any type of suitable storage. For example, the phone number register can be stored on a non-removable media, such as a computer chip installed in the communications device, a removable media (e.g., a Secure Digital card, a flash drive, a USB drive, magnetic tape, floppy disk, a compact disc, or the like) or a removable drive such as a removable hard drive.

At 406, the processor may receive an input representative of at least one digit selected via an input component of a communications device. Based on the digit(s), the a search module may search the phone number register for a phone number that corresponds to the digit(s). A corresponding phone number is a phone number in the phone number register having the digit(s). The input can have multiple digits such that the corresponding phone number is a phone number in the phone number register having those multiple digits in the same order by which they were input into the communications device.

The processor may provide the search results to a communications device component or a telecommunications network component. In an example configuration, the communications device component is a display unit configured to display the search results. The search results can be displayed as a selectable list of corresponding phone numbers. In another example configuration, the mobile phone component is a dialing component. Upon receipt and display of the search results, the dialing component may dial a selected number. If the search results comprise a single corresponding phone number, the user can select the number for dialing or the dialing component can be programmed to automatically dial that number.

In another example configuration, the telecommunications network component is a transmitter configured to further provide the search results to the communications device. For example, if the network device that generates, stores, and searches the phone number register is accessible via a network, such as network 202 described above, the network device may transmit the search results over the network via a transmitter. Accordingly, a communications device may receive the search results over the network.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

Figure 5:
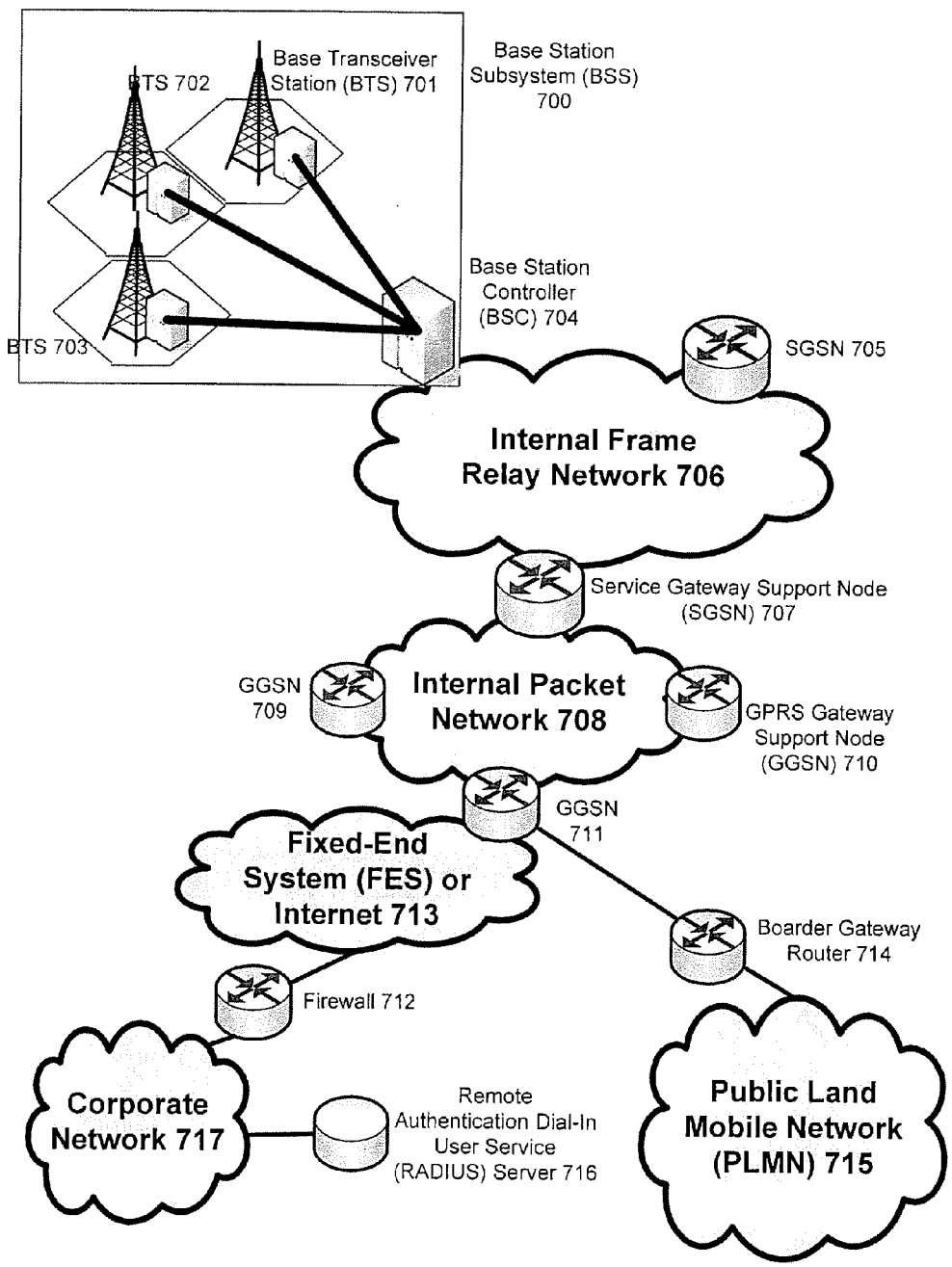
FIG. 5 depicts an overall block diagram of an example packet-based mobile cellular network environment, such as a GPRS network, in which aspects of an embodiment may be practiced.

FIG. 5 depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 700 (only one is shown in FIG. 5), each of which comprises a Base Station Controller ("BSC") 704 serving a plurality of Base Transceiver Stations ("BTS") such as, for example, the BTSs 701, 702 and 703. may be the access points where users of packet-based mobile devices become connected to the wireless network. In an embodiment, the packet traffic originating from user devices is transported over the air interface to the BTS 703, and from the BTS 703 to the BSC 704. Base station subsystems, such as the BSS 700, may be a part of internal frame relay network 706 that may include Service GPRS Support Nodes ("SGSN") such as the SGSN 705 and 707. Each SGSN 705, 707, etc. may be in turn connected to an internal packet network 708 through which the SGSN 705, 707, etc. can route data packets to and from a plurality of gateway GPRS support nodes (GGSN) 709, 710 and 711, etc.

As illustrated, the SGSN 707 and the GGSNs 709, 710 and 711 may be part of the internal packet network 708. Gateway GPRS serving nodes 709, 710 and 711 may provide an interface to external Internet Protocol ("IP") networks such as Public Land Mobile Network ("PLMN") 715, corporate intranets 717, Fixed-End System ("FES"), the public Internet 713 and/or the like. As illustrated, subscriber corporate network 717 may be connected to the GGSN 711 via a firewall 712; and the PLMN 715 may be connected to the GGSN 711 via a boarder gateway router 714. A Remote Authentication Dial-In User Service ("RADIUS") server 716 may be used for caller authentication when a user of a mobile cellular device calls corporate network 717, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

Figure 6:
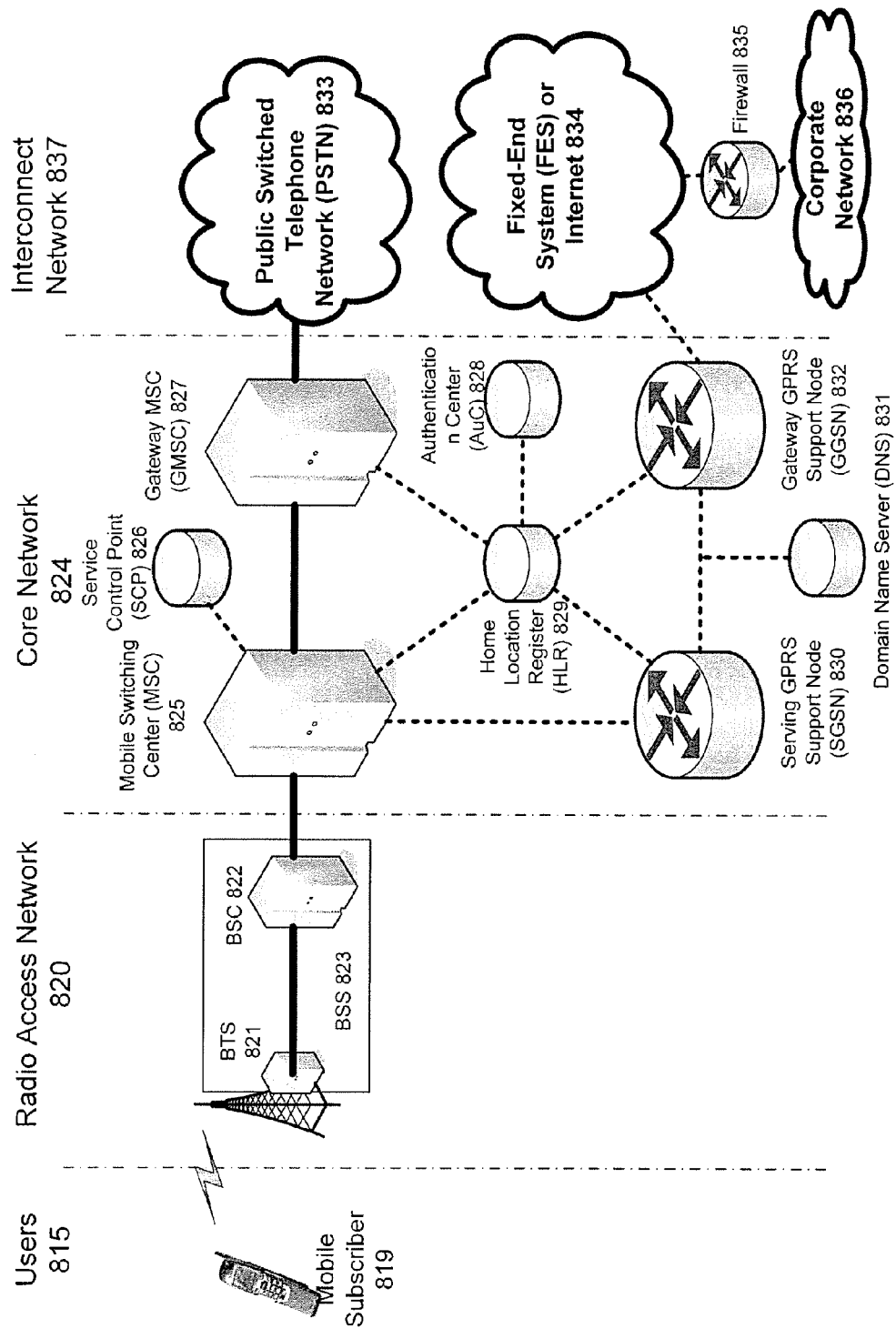
FIG. 6 illustrates an example alternate block diagram of an exemplary GSM/GPRS/IP multimedia network architecture in which the disclosed techniques may be incorporated.
Figure 7:
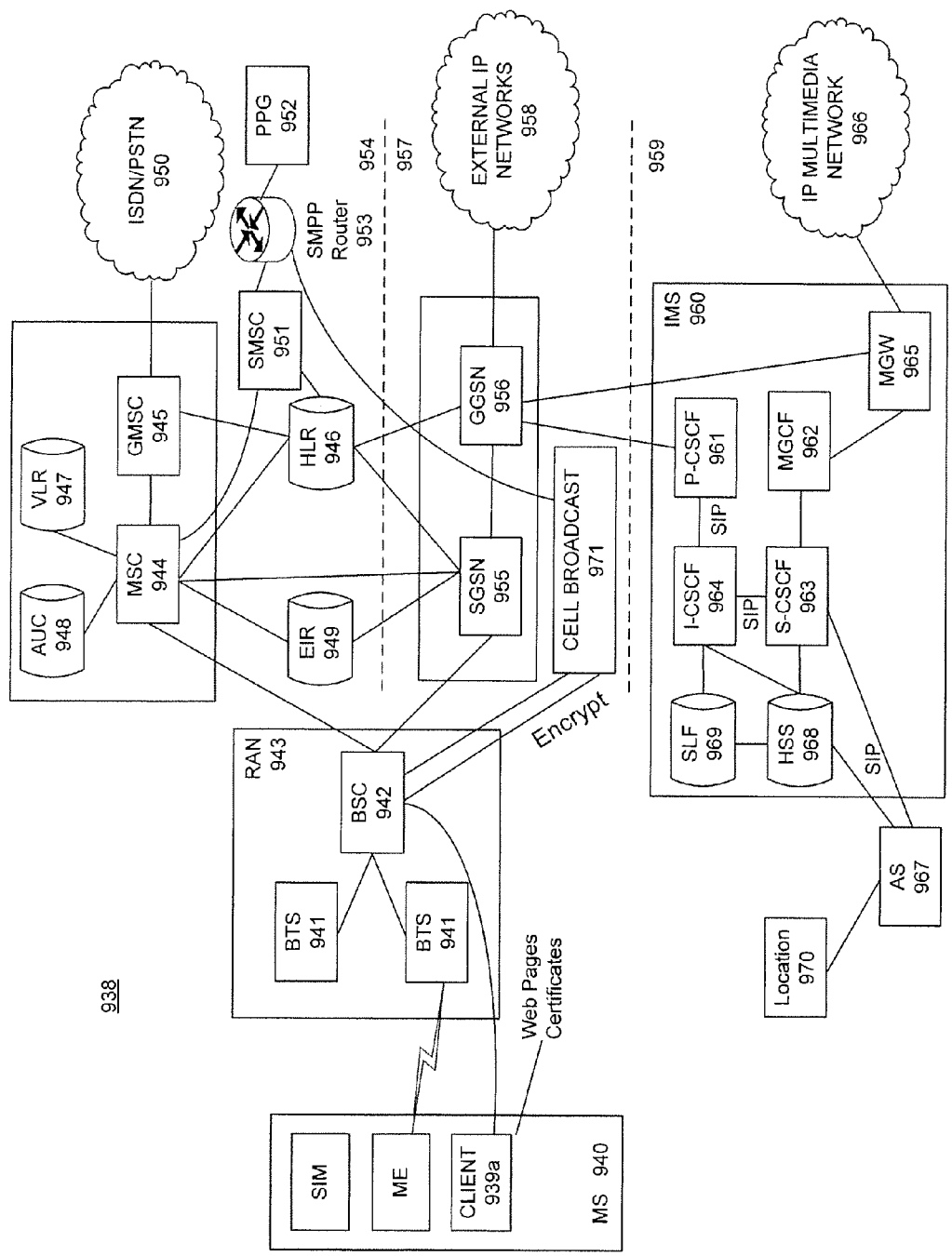
FIG. 7 illustrates another exemplary block diagram view of a GSM/GPRS/IP multimedia network architecture.

FIG. 6 illustrates the architecture of a typical GPRS network as segmented into four areas: users 815, radio access network 820, core network 824 and interconnect network 837. The users area 815 may include a plurality of end users. The radio access network are 820 may include a plurality of base station subsystems such as the BSSs 823, which include BTSs 821 and BSCs 822. The core network are 824 may include a host of various network elements. As illustrated here, the core network 824 may include a Mobile Switching Center ("MSC") 825, a Service Control Point ("SCP") 826, a gateway MSC 827, a SGSN 830, a Home Location Register ("HLR") 829, an Authentication Center ("AuC") 828, a Domain Name Server ("DNS") 831 and a GGSN 832. The interconnect network area 837 also may include networks and network elements. As illustrated in FIG. 6, the interconnect network are 837 may include a Public Switched Telephone Network ("PSTN") 833, a Fixed-End System ("FES") and/or the Internet 834, a firewall 835 and/or a Corporate Network 836.

A mobile switching center 825 may be connected to a large number of base station controllers. At MSC 825, for example, depending on the type of traffic, the traffic may be separated such that voice may be sent to Public Switched Telephone Network ("PSTN") 833 through Gateway MSC ("GMSC") 827, and/or data may be sent to the SGSN 830, which then sends the data traffic to the GGSN 832 for further forwarding.

When the MSC 825 receives call traffic, for example, from the BSC 822, it may send a query to a database hosted by the SCP 826. The SCP 826 may process the request and may issue a response to the MSC 825 so that it may continue call processing as appropriate.

The HLR 829 may be a centralized database for users to register with the GPRS network. The HLR 829 may store static information about the subscribers such as the International Mobile Subscriber Identity ("IMSI"), subscribed services, and/or a key for authenticating the subscriber. The HLR 829 may also store dynamic subscriber information such as the current location of the mobile subscriber. Associated with HLR 829 may be an AuC 828. The AuC 828 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 6, mobile subscriber 819 may initiate the attach process by turning on the network capabilities of the mobile device. An attach request may be sent by the mobile subscriber 819 to the SGSN 830. The SGSN 830 may query another SGSN, to which the mobile subscriber 819 may have been attached before, for the identity of the mobile subscriber 819. Upon receiving the identity of the mobile subscriber 819 from the other SGSN, the SGSN 830 may request more information from the mobile subscriber 819. This information may be used to authenticate the mobile subscriber 819 to the SGSN 830 by the HLR 829. Once the mobile subscriber 819 is verified, the SGSN 830 may send a location update to the HLR 829 indicating the change of with a Subscriber identity Module (SIM). The SIM may include an International Mobile Subscriber Identity (IMSI), which may include a unique identifier of a subscriber. The BTS 941 may be physical equipment, such as a radio tower, that enables a radio interface to communicate with the MS 940. Each BTS may serve more than one MS 940. The BSC 942 may manage radio resources, including the BTS 941. The BSC 942 may be connected to several BTS 941. The BSC 942 and BTS 941 components, in combination, are generally referred to as a base station (BS) and/or a radio access network (RAN) 943.

The GSM core network 954 may include a Mobile Switching Center (MSC) 944, a Gateway Mobile Switching Center (GMSC) 945, a Home Location Register (HLR) 946, a Visitor Location Register (VLR) 947, an Authentication Center (AuC) 949, and an Equipment Identity Register (EIR) 948. The MSC 944 may perform a switching function for the network. The MSC may performs other functions, such as registration, authentication, location updating, handovers, and call routing. The GMSC 945 may provide a gateway between the GSM network and other networks, such as an Integrated Services Digital Network (ISDN) or a Public Switched Telephone Network (PSTN) 950. In other words, the GMSC 945 may provide interworking functionality with external networks.

The HLR 946 may include a database that contains administrative information regarding each subscriber registered in a corresponding GSM network. The HLR 946 may contain the current location of each mobile subscriber. The VLR 947 may include a database that contains selected administrative information from the HLR 946. The VLR may contain information necessary for call control and provision of subscribed services for each mobile subscriber currently located in a geographical area controlled by the VLR 947. The HLR 946 and the VLR 947, together with MSC 944, may provide call routing and roaming capabilities of the GSM network. The AuC 948 may provide parameters for authentication and/or encryption functions. Such parameters may allow verification of a subscriber's identity. The EIR 949 may store security-sensitive information about the mobile equipment.

The Short Message Service Center (SMSC) 951 may allow one-to-one Short Message Service (SMS) messages to be sent to/from the mobile subscriber 940. For example, the Push Proxy Gateway (PPG) 952 may be used to "push" (i.e., send without a synchronous request) content to mobile subscriber 902. The PPG 952 may act as a proxy between wired and wireless networks to facilitate pushing of data to MS 940. Short Message Peer to Peer (SMPP) protocol router 953 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 940 may first registers with the network to indicate its current location by performing a location update and IMSI attach procedure. MS 940 may send a location update including its current location information to the MSC/VLR, via the BTS 941 and the BSC 942. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 957 may be logically implemented on the GSM core network architecture by introducing two packet-switching network nodes, a serving GPRS support node (SGSN) 955 and a cell broadcast and a Gateway GPRS support node (GGSN) 956. The SGSN 955 may be at the same hierarchical level as the MSC 944 in the GSM network. The SGSN may control the connection between the GPRS network and the MS 940. The SGSN may also keep track of individual MS locations, security functions, and access controls.

The Cell Broadcast Center (CBC) 971 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 956 may provide a gateway between the GPRS network and a public packet network (PDN) or other IP networks 958. That is, the GGSN may provide interworking functionality with external networks, and may set up a logical link to the MS through the SGSN. When packet-switched data leaves the GPRS network, it is transferred to external TCP-IP network 958, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 957 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM 1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while received data and vice versa.

IP multimedia network 959 was introduced with 3GPP Release 5, and includes IP multimedia subsystem (IMS) 960 to provide rich multimedia services to end users. A representative set of the network entities within IMS 960 are a call/session control function (CSCF), media gateway control function (MGCF) 962, media gateway (MGW) 965, and a master subscriber database, referred to as a home subscriber server (HSS) 968. HSS 968 may be common to GSM network 954, GPRS network 957 as well as IP multimedia network 959.

IP multimedia system 960 is built around the call/session control function, of which there are three types: interrogating CSCF (I-CSCF) 964, proxy CSCF (P-CSCF) 961 and serving CSCF (S-CSCF) 963. P-CSCF 961 may be the MS's first point of contact with IMS 960. P-CSCF 961 forwards session initiation protocol (SIP) messages received from the MS to an SIP server in a home network (and vice versa) of the MS. P-CSCF 961 may also modify an outgoing request according to a set of rules defined by the network operator (for example, address analysis and potential modification).

The I-CSCF 964 may be an entrance to a home network, may hide the inner topology of the home network from other networks, and may provide flexibility for selecting an S-CSCF. The I-CSCF 964 may contact subscriber location function (SLF) 969 to determine which HSS 968 to use for the particular subscriber, if multiple HSSs 968 are present. The 5-CSCF 963 may perform the session control services for the MS 940. This includes routing originating sessions to external networks and routing terminating sessions to visited networks. S-CSCF 963 may also decide whether application server (AS) 967 is required to receive information on an incoming SIP session request to ensure appropriate service handling. This decision may be based on information received from HSS 968 (or other sources, such as application server 967). The AS 967 also communicates to location server 970 (e.g., a Gateway Mobile Location Center (GMLC)) that provides a position (e.g., latitude/longitude coordinates) of the MS 940.

The HSS 968 may contain a subscriber profile and may keep track of which core network node is currently handling the subscriber. It may also support subscriber authentication and authorization functions (AAA). In networks with more than one HSS 968, a subscriber location function provides information on HSS 968 that contains the profile of a given subscriber.

The MGCF 962 may provide interworking functionality between SIP session control signaling from IMS 960 and ISUP/BICC call control signaling from the external GSTN networks (not shown). It also may control the media gateway (MGW) 965 that provides user-plane interworking functionality (e.g., converting between AMR- and PCM-coded voice). The MGW 965 may communicate with other IP multimedia networks 966.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, the methods and apparatus for searching a phone number register, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for abbreviated dialing and searching a phone number register also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing information pertaining to a motor vehicle. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While the present subject matter has been described in connection with the various embodiments of the various figures, it is to be understood that other similar embodiments can be used or modifications and additions can be made to the described embodiment for performing the same function of generating and searching a phone register without deviating therefrom. For example, one skilled in the art will recognize that a system for abbreviated dialing as described can apply to any environment, whether wired or wireless, and can be applied to any number of devices connected via a communications network and interacting across the network. Therefore, providing search results with corresponding phone numbers should not be limited to any single embodiment, but rather should be construed in breadth and scope in accordance with the appended claims.

While the disclosed techniques been described in connection with the preferred embodiments of the various figures, it is to be understood that other similar embodiments may be used or modifications and additions may be made to the described embodiment for performing the same function of the presently disclosed techniques without deviating therefrom. For example, while exemplary network environments of the disclosed techniques are described in the context of a networked environment, such as a peer to peer networked environment, one skilled in the art will recognize that the presently disclosed techniques are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the presently disclosed techniques may be implemented in or across a plurality of processing chips or devices, and storage may similarly be effected across a plurality of devices. Therefore, the presently disclosed techniques should not be limited to any single embodiment, but rather should be construed in breadth and scope in accordance with the appended claims.

What is claimed is:

1. A device comprising:
memory comprising executable instructions; and
a processor coupled to the memory, when the processor executes the executable instructions, the processor effectuates operations comprising:
responsive to an event, searching a phone number register for at least one corresponding phone number that corresponds to a digit of a phone number, wherein a corresponding phone number is a phone number comprising the digit in a location other than a first digit location;
requesting a digit adjustment when a result of the search comprises more than one phone number; and
providing a result of the search when the result of the search comprises a single phone number.

2. The device of claim 1, wherein the phone number register further comprises phone numbers from at least one of a global address book, a communication network's subscriber list, a subscriber's incoming/outgoing call list, or a subscriber's recent call list.

3. The device of claim 1, wherein:
the event comprises receipt of an indication of the digit of the phone number; and
the result of the search comprises a plurality of corresponding phone numbers for display in a selectable list.

4. The device of claim 1, wherein the result of the search comprises one corresponding phone number and the device is configured to route a call based on the one corresponding phone number.

5. The device of claim 1, the operations further comprising receiving a selected phone number from a provided selectable list of a plurality of corresponding phone numbers, wherein the device is configured to route a call based on the selected phone number.

6. The device of claim 1, wherein the first indication of the digit is representative of at least two digits and the corresponding phone number is a phone number in the phone number register.

7. The device of claim 1, the operations further comprising receiving an adjusted phone number when the digit adjustment is requested.

8. The device of claim 7, wherein the received adjusted phone number is added to the phone number register for a display in an order of receipt of adjusted phone numbers.

9. A method comprising:
responsive to an event, searching a phone number register for at least one corresponding phone number that corresponds to a digit of a phone number,
wherein a corresponding phone number is a phone number comprising the digit in a location other than a first digit location;
requesting a digit adjustment when a result of the search comprises more than one phone number; and
providing a result of the search when the result of the search comprises a single phone number.

10. The method claim 9, wherein the phone number register further comprises phone numbers from at least one of a global address book, a communication network's subscriber list, a subscriber's incoming/outgoing call list, or a subscriber's recent call list.

11. The method claim 9, wherein:
the event comprises receipt of an indication of the digit of the phone number; and
the result of the search comprises a plurality of corresponding phone numbers for display in a selectable list.

12. The method claim 9, wherein the result of the search comprises one corresponding phone number and the device is configured to route a call based on the one corresponding phone number.

13. The method claim 9, the operations further comprising receiving a selected phone number from a provided selectable list of a plurality of corresponding phone numbers, wherein the device is configured to route a call based on the selected phone number.

14. The method claim 9, wherein the first indication of the digit is representative of at least two digits and the corresponding phone number is a phone number in the phone number register.

15. The method claim 9, the operations further comprising receiving an adjusted phone number when the digit adjustment is requested.

16. The method claim 15, wherein the received adjusted phone number is added to the phone number register for a display in an order of receipt of adjusted phone numbers.

17. A computer readable storage medium that is not a propagating signal, the computer readable storage medium comprising executable instructions that when executed by a processor cause the processor to effectuate operations comprising:
responsive to an event, searching a phone number register for at least one corresponding phone number that corresponds to a digit of a phone number, wherein a corresponding phone number is a phone number comprising the digit in a location other than a first digit location;
requesting a digit adjustment when a result of the search comprises more than one phone number; and
providing a result of the search when the result of the search comprises a single phone number.

18. The computer readable storage medium of claim 17, the operations further comprising providing the search results for display as a displayable list of corresponding phone numbers.

19. The computer readable storage medium of claim 17, the operations further comprising dialing a number that is selected from the search results or, if the search results comprise one corresponding phone number, automatically dialing the one corresponding phone number from the search results.

20. The computer readable storage medium of claim 17, wherein:
the event comprises receipt of an indication of the digit of the phone number; and
the first input comprises at least two digits and the corresponding phone number is a phone number in the phone number register having the at least two digits in an order by which they are selected via the interface component of the communications device.

* * * * *